Patented Jan. 19, 1954

2,666,798

UNITED STATES PATENT OFFICE 2,666,798

OLEFIN ISOMERIZATION

Francis E. Condon, Bartlesville, Okla., assignor to Phillips Petroleum Company, a corporation of Delaware No Drawing. Application May 5, 1950, Serial No. 160,383

7 Claims. (Cl. 260—683.2)

This invention relates to the isomerization of mono-olefins. In one embodiment this invention relates to a process for the isomerization of mono-olefins in which the double bond of the olefin is shifted in the presence of elemental iodine as a catalyst.

An object of my invention is to provide a process for the isomerization of mono-olefins.

Another object is to provide for the catalytic isomerization of a mono-olefin to form another mono-olefin having the same chain structure.

Another object is to provide for the utilization of elemental iodine as a catalyst in a process for the isomerization of olefins.

Other objects will be apparent to those skilled in the art from the accompanying discussion and disclosure.

In accordance with my invention, a mono-olefin is isomerized by contacting same with from 1 to 15 per cent of its weight of elemental iodine as a catalyst, at a temperature within the limits of from 125 and 250° F., under a pressure sufficient to maintain the reaction mixture in liquid phase, generally from 0 to 75 p. s. i. g., for a period of from 1 to 24 hours. In this manner, the double bond of the mono-olefin reactant is shifted and the chain structure of the original mono-olefin reactant is unaltered.

Preferred mono-olefins isomerized in accordance with my invention are those in which the longest straight chain contains from 4 to 6 carbon atoms, although longer chain olefins can be used. Representative of these mono-olefins are 2,3-dimethyl-1-butene, 2-methyl-1-butene, 3-ethyl-2-pentene, 2-methyl-3-ethyl-2-pentene, 2-methyl-2-hexene, 2,3,4-trimethyl-2-hexene, 1-butene, 1-pentene, 2-methyl-1-heptene, and the like. The shift of the double bond that occurs during the isomerization of such mono-olefinic materials takes place more often to an immediately adjacent position, although some shift of the double bond can take place over a greater portion of the molecule. For example, in the isomerization of 2-methyl-3-ethyl-2-pentene, the predominant olefin isomerization product formed will be 2-methyl-3-ethyl-1-pentene or 2-methyl-3-ethyl-3-pentene, or a mixture of these two isomers, although smaller amounts of 2-methyl-3-ethyl-4-pentene may also be formed.

In one embodiment of my invention the mono-olefin reactant is contacted with elemental iodine under reaction conditions within the limits discussed above, the resulting reaction mixture is cooled, and iodine catalyst is removed from the resulting reaction mixture by washing with a suitable washing liquid, such as an acidified aqueous solution of sodium bisulfite. The washed hydrocarbon phase is then separated from the washing mixture and distilled to separate any unconverted mono-olefin therefrom and to recover the isomerization product.

In a preferred embodiment of my invention, a mono-olefin reactant in which the longest straight chain contains from 4 to 5 carbon atoms is admixed with from 2 to 8 per cent of its weight of elemental iodine and the resulting admixture maintained under total reflux for a period of from about 4 to 12 hours, at a temperature in a preferred range of from about 150 to 175° F. At the end of the reflux period the reaction mixture is washed and the isomerization product recovered in the manner discussed hereabove.

Although I generally prefer to remove the iodine catalyst from the reaction mixture by simple washing, it can be removed by any suitable means, as for example by solvent extraction in aqueous ethanol. In the latter instance the iodine can then be recovered from the resulting extract mixture and recycled to the reaction zone.

Although I prefer generally to conduct the isomerization reaction of my invention under total reflux conditions, other means well known to those skilled in the art for contacting reactant materials can be employed, such as for example, effecting the agitation of reactant and catalyst in a reaction chamber by means of a mechanical stirrer, or in a reaction tank equipped with a recirculation pump.

In conducting some of the embodiments of my invention, the use of a solvent is often advantageous, particularly when a relatively low-boiling reactant material as butene-1 or pentene-1, or the like, is employed. In such an application, the solvent employed is preferably a high boiling liquid, thus materially reducing the total pressure necessary to maintain the isomerization reaction mixture in liquid phase. Any suitable non-reactive solvent can be employed when desired, particularly hydrocarbons and perfluorocarbons, i. e. $C_nF_{2n+2}$. When employing a solvent in this manner, it is preferable to utilize one having a boiling range sufficiently different from that of the total isomerization reaction product so that it can be easily separated from the final reaction mixture. Suitable hydrocarbon solvents are paraffin hydrocarbons containing generally at least 7 carbon atoms and up to 15 carbon atoms in the molecule, or higher when desired, such as octane, decane, tetradecane, or the like. Suitable perfluorocarbon solvents include those containing from 6 to 15 carbon atoms in the molecule, such as perfluoroheptane, perfluorodecane, perfluorododecane, perfluoromethylcyclohexane, perfluorocyclopentane, or the like.

Advantages of this invention are illustrated in the following example. The reactants and their proportions and other specific ingredients are presented as being typical and should not be construed to limit the invention unduly.

Forty parts by weight of 2,3-dimethyl-1-butene, having a boiling point of 129 to 130° F. at 760 mm. and a refractive index at 20° C. of 1.3896 was admixed with 1.7 parts by weight of elemental iodine, and the resulting admixture was heated under total reflux for a period of 8 hours. At the conclusion of the refluxing period the reaction mixture was washed with acidified aqueous sodium bisulfite, and the washed hydrocarbon portion separated. The hydrocarbon thus separated was dried and distilled to separate unisomerized olefin reactant, and to recover the isomerization product. The isomerization product fraction recovered had a boiling range of from 158 to 162° F. and a refractive index at 20° C. of 1.4078, and was principally 2,3-dimethyl-2-butene. The product fraction thus recovered comprised 37 per cent by weight of the 2,3-dimethyl-1-butene initially introduced into the reaction. The 2,3-dimethyl-2-butene product was identified by bromination of the product and isolation of a resulting 2,3-dibrom-2,3-dimethyl butane, melting at 157 to 158° C.

As will be evident to those skilled in the art, various modifications can be made or followed, in the light of the foregoing disclosure and discussion, without departing from the spirit or scope of the disclosure or from the scope of the claims.

I claim:

1. A process for shifting a double bond of an isomerizable mono-olefin, comprising contacting such an olefin with from 1 to 15 per cent of its weight of elemental iodine at a temperature within the limits of 125 and 250° F. under a pressure sufficient to maintain the resulting admixture in liquid phase, for a period in the range of from 1 to 24 hours.

2. A process for shifting the double bond of a mono-olefin in which the longest straight chain contains from 4 to 6 carbon atoms, comprising admixing such a mono-olefin with from 2 to 8 per cent of its weight of elemental iodine, maintaining the resulting admixture at a temperature within the limits of 150 to 175° F. for a period of from 4 to 12 hours, under a pressure sufficient to maintain the resulting admixture in liquid phase, and recovering as a product of the process an olefin isomer of said mono-olefin.

3. The process of claim 2 wherein the longest straight chain in the mono-olefin reactant contains from 4 to 5 carbon atoms.

4. A process for the production of 2,3-dimethyl-2-butene, comprising admixing 2,3-dimethyl-1-butene with from 2 to 8 per cent of its weight of elemental iodine and heating the resulting admixture at a temperature within the limits of 150 to 175° F. for a period of from 4 to 12 hours in liquid phase, and recovering 2,3-dimethyl-2-butene from the resulting reaction mixture as a product of the process.

5. A process for the isomerization of 2,3-dimethyl-1-butene to 2,3-dimethyl-2-butene, comprising admixing 2,3-dimethyl-1-butene with from 1 to 15 per cent of its weight of elemental iodine and maintaining the resulting admixture under total reflux for a period of from 1 to 24 hours at a reflux liquid temperature within the limits of 125 and 250° F., washing iodine free from the resulting reaction mixture, recovering a hydrocarbon phase from the washed reaction mixture, distilling the hydrocarbon phase thus recovered and recovering 2,3-dimethyl-2-butene as a product of said distilling.

6. The process of claim 5 wherein the reaction mixture is washed with acidified aqueous sodium bisulfite.

7. In the isomerization of an isomerizable mono-olefin, the improvement comprising effecting said isomerization in the presence of elemental iodine at a temperature within the limits of 125 and 250° F., whereby the double bond of said isomerizable monoolefin is shifted.

FRANCIS E. CONDON.

References Cited in the file of this patent

UNITED STATES PATENTS

| Number | Name | Date |
|---|---|---|
| 2,422,802 | Schelling et al. | June 24, 1947 |
| 2,451,741 | Huber | Oct. 19, 1948 |

FOREIGN PATENTS

| Number | Country | Date |
|---|---|---|
| 613,684 | Great Britain | Dec. 1, 1948 |

OTHER REFERENCES

Frost et al.: "Compt. Rend. Acad. Sci. U. R. S. S.," vol. 4, pages 373–376 (1936).

Zechmeister: Berichte, vol. 72B, pages 1340–1346 (1939).

Frank et al.: J. Am. Chem. Soc., vol. 69, pages 2313–2317 (1947).

Egloff et al.: "Isomerization of Pure Hydrocarbons," pages 132–134, 333. Copyright 1942 by Reinhold Publishing Corp., New York.